March 2, 1943.    J. M. WESTRATE    2,312,856
DEVICE FOR RAISING THE WHEELS OF VEHICLES AND
SUPPORTING THE SAME IN RAISED POSITION
Filed May 4, 1940    2 Sheets—Sheet 1

Witness
Richard F. Haskins

Inventor
John M. Westrate
By Rice & Rice
Attorneys

Witness:
Richard F. Haskins

Inventor
John M. Westrate
By Rice & Rice
Attorney

Patented Mar. 2, 1943

2,312,856

UNITED STATES PATENT OFFICE 2,312,856

DEVICE FOR RAISING THE WHEELS OF VEHICLES AND SUPPORTING THE SAME IN RAISED POSITION

John M. Westrate, Grand Rapids, Mich.

Application May 4, 1940, Serial No. 333,277

9 Claims. (Cl. 254—94)

The present invention relates to devices for raising the wheels of vehicles (as automobiles and the like) from the ground and supporting the same in raised position, for removing and replacing such wheels or the injured and deflated tires thereof.

Devices for this general purpose, as the well-known automobile jacks, are machines of many relatively movable operating parts, are expensive to manufacture, and require considerable adjustment and time in their operation. It is therefore the object of the present invention to provide an improved device for raising vehicle wheels and supporting them thus raised, which shall be very simple and economical to manufacture and very easy to operate; and particularly, to provide such a device which shall have few if any relatively movable operative parts and may in one form thereof be made of one piece.

These and any other and more specific objects hereinafter appearing are attained by, and the invention finds preferable embodiment in, the illustrative device particularly described in the body of this specification and illustrated by the accompanying drawings, in which.

Figure 6:
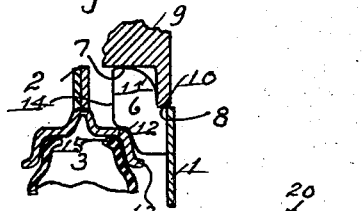
Figure 6 is a sectional view of portions of the wheel and parts carried thereby and of the device applied thereto, taken on the approximately radial line 6—6 of Figure 4.

The wheel raising and supporting device illustrated by Figures 1–8 of these drawings is an elongated sturdy one-piece element 1 (a metal casting or stamping or the like) extending spoke-like radially of the wheel 2 and outwardly somewhat beyond the periphery of the wheel to which it is applied, i. e. beyond its tire 3. This element has at its outer end a foot or base 4 adapted to rest firmly on the ground 5 for maintaining said element in its upright wheel-supporting position shown in Figure 4, and said element has at its inner end suitable means for releasably connecting or clamping it with the wheel so as to be carried by the wheel in its rotation. Various forms and types of such connecting means may be adopted but the specific form illustrated appears the most preferable. As shown, said element has at its inner end (i. e. its upper end in Figures 1, 2, 4 and 6) a pair of laterally extending parallel tongues 6 adapted to supportingly engage portions of the wheel or parts rotatably carried by or in connection therewith. These tongues thus have top shelves 7 and lower or shoulder shelves 8 adapted in the device's operative position to supportingly engage the under side of the wheel's brake drum 9 and the annular flange 10 thereof respectively, as best seen in Figure 6.

Figures 7, 8:
Figure 7 is a view similar to Figure 6 but showing a position of the device while being applied to the wheel.
Figure 8 is a forward or rearward view of the device, illustrating a modified construction thereof.
Figure 9:
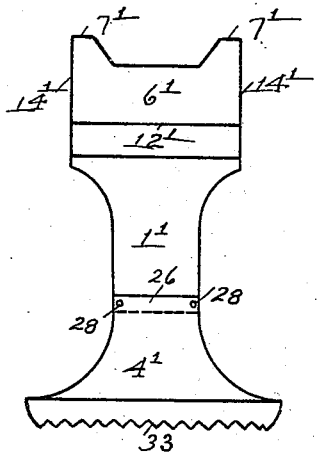
Figures 9 and 10 are views similar to Figures 1 and 2 respectively and illustrates a modified construction of the device.
Figure 10:
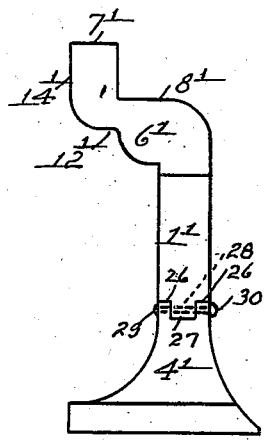
Figure 11:
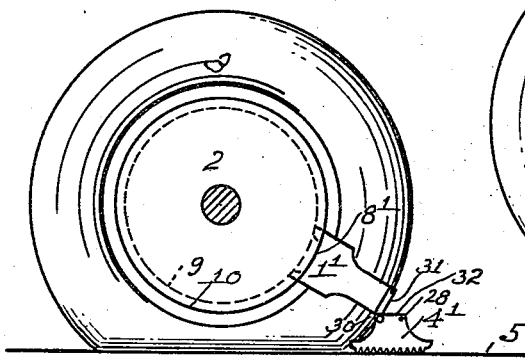
Figures 11 and 12 are views similar to Figures 5 and 4 respectively and illustrate said modified construction.
Figure 12:
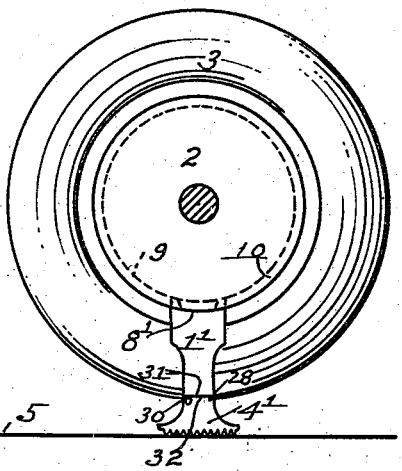

Between these shelves the inner (upper) edges of these tongues may be curved or cut away at 11 and the opposite edges of the tongues have notches or recesses 12 therein, all as shown in Figures 6 and 7. The device is readily and securely applied to the wheel by thrusting its said inner (upper) end between the wheel's brake drum 9 and the wheel's felloe or rim 13 which mounts the tire thereon, as indicated in Figure 7 and then turning the device from the position shown in that view downwardly to the operative position seen in Figure 6 wherein the device extends parallelly with the side of the wheel. In thus turning the device downwardly, the shelf or shoulder 8 pivots on the edge of the brake drum's flange 10 and the lateral edges 14 of the tongues slide over the angle 15 of the wheel's rim until the notches 12 in the edges 14 reach and receive said angle 15 whereupon the inner (upper) shelf 7 is turned into supporting engagement with the side of drum 9 and both shelves 7 and 8 are now in supporting engagement with the wheel. It will be seen that in thus applying the device the tongues are pressed edgewise between the brake drum and its flange on one side and the wheel's rim on the other side. It will also be seen that, the tongues engaging the wheel on opposite sides of a radius thereof and at a considerable angular distance apart, the device is securely held against dislodging from the wheel in its circumferential direction, although the device may be readily detached and removed by turning it outwardly from the side of the wheel.

Figure 1:
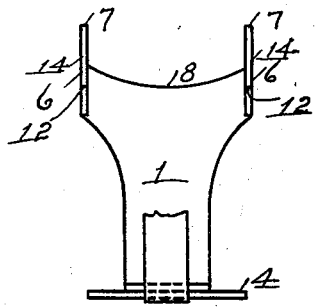
Figure 1 is an elevational side view of a device for raising and supporting vehicle wheels.
Figure 2:
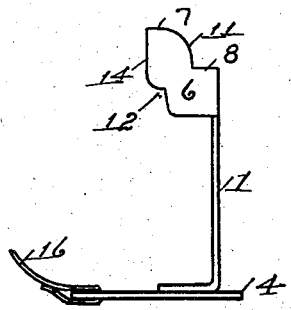
Figure 2 is an elevational forward or rearward view thereof looking toward the right hand side of Figure 1.
Figure 4:
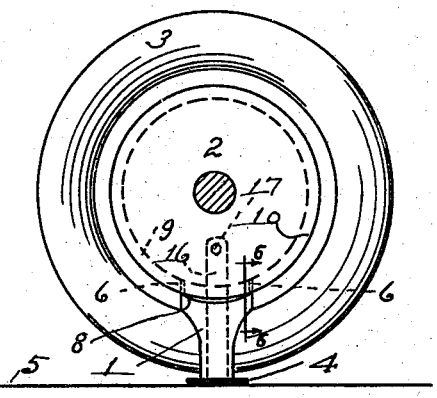
Figure 4 is a side view of this wheel and the applied device, in the position wherein the raised wheel is held supported by the device.

Additional means for securely but detachably connecting the device with the wheel may be employed, as the flexible strap 16 secured at one end to the foot 4, passing around (under) the tire and releasably fastened as by a button 17 or the like on the far side of the wheel, as indicated in Figures 2 and 4.

Figure 3:
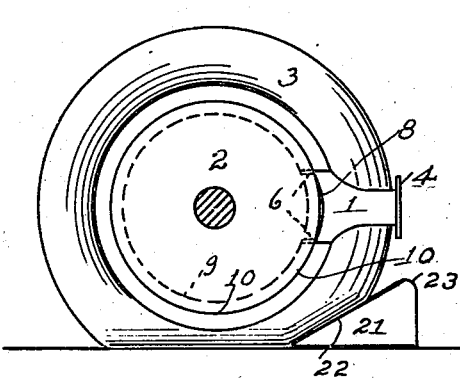
Figure 3 is a side view of an automobile wheel (having a deflated tire) and of said device applied thereto, this view showing also an inclined block on which the wheel rolls to raised position in which it is supported by said device.
Figure 5:
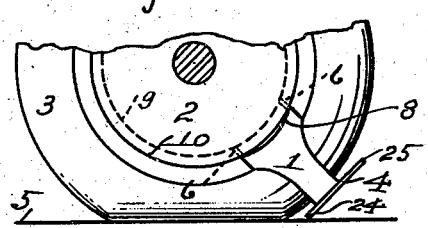
Figure 5 is a side view of the wheel and applied device in their turned position at the beginning of the raising of the wheel by the device, without the use of such a block.

As illustrated in Figure 3, a block 21 having an inclined upper surface 22 may be laid on the ground and the automobile driven slowly to cause its flat tire to ride up on said surface and over the high end 23 thereof, during which movement the device, turning with the wheel, is brought to an upright position, and (the tire having passed the high end 23), the wheel moves to the position seen in Figure 4 wherein the device's foot rests on the ground and the wheel is supported above the ground. The use of the block 21, or the like, may however be dispensed with, especially where the tire is only partially deflated (as shown in Figure 5) and the automobile may be slowly driven toward the right hand side of Figure 5 so that the forward edge 24 of the device's foot, engaging the ground as shown, prevents the device from slipping and causes it to tilt to upright position, thus raising the wheel above the ground. The foot desirably extends an increased distance rearwardly as indicated at 25 in Figure 5, to prevent the device from being tilted out of upright position by said movement of the automobile.

It will thus be seen that this device is very simple in construction and may be very economically manufactured, and that it is a one-piece structure without relatively-movable operative parts. But, if found desirable, its middle or shank portion may comprise a pair of relatively adjustable parallel parts 20 (for use with automobiles having wheels of widely different radii), said parts having mutually engaging serrations 18 and being held together by threaded bolts 19, as shown in Figure 8.

In the modified construction of the device illustrated by Figures 9–12, parts corresponding with the parts illustrated by Figures 1–8 are designated by the same reference numerals with a prime mark added. In this modified construction, the elongated element's main portion 1' and its outer or foot portion 4' are separate and are connected adjacent their forward or rearward sides by a knee joint comprising the spaced ears 26 of portion 4' and the intervening ear 27 of portion 1' through whose aligned openings 28 the pivot pin 29 having a knob 30 removably extends. The portion 1' being applied to the wheel and the wheel being rolled toward the right hand side of Figure 11, the portion 1' is turned on the pivot pin until said portion's lower end 31 rests on the upper end 32 of portion 4' during which movement the wheel is raised to the position seen in Figure 12 wherein the portion 1' is in its upright position.

The portions 1' and 4' thus form a toggle having the pivot pin as its knuckle. This pivot pin may be inserted into the forward or the rearward aligned openings 28 as desired to adapt the device for use in the wheel's forward or rearward rolling movement, etc. Serrations or the like 33 on the bottom of the foot portion 4' may be provided for holding it against slipping on the ground.

The device may likewise be employed as a mud, sand, snow or ice hook which when detachably clamped between the rim and brake drum in the manner above described serves to enable the operator of a motor car to drive the same out of a place in which he finds the car immobile.

The invention being intended to be pointed out in the claims, is not to be limited to or by details of construction of the particular embodiment thereof illustrated by the drawings or hereinbefore described, and while but several embodiments of the invention have been herein shown and described, it will be understood that certain details of the constructions shown may be altered or omitted without departing from the spirit of the invention as the same is defined by the following claims.

I claim:

1. A device of the class described for raising a vehicle's wheel from the ground and supporting the same in raised position, consisting of an elongated element extending radially of the wheel and beyond the periphery thereof, having releasable means for connecting said element with the wheel in rotatable relation therewith and a foot for maintaining said element in upright wheel-supporting position, said means including a pair of integrally formed parallel tongue portions of said element adapted to be spacedly removably inserted tightly between parallel parts carried by the wheel.

2. A device of the class described for raising and supporting in raised position a vehicle's wheel which has a tire-carrying rim and a brake drum comprising a body portion and a radially extending flange, said device consisting of an elongated element extending radially of the wheel and beyond the periphery thereof, having a foot for maintaining said element in upright wheel-supporting position and releasable means for connecting said element with the wheel in rotatable relation therewith, said means including an integrally formed tongue portion of said element having radially spaced shelf portions and adapted to be removably inserted between the brake drum and the wheel's rim in a position wherein the shelf portions supportingly engage the brake drum's body portion and said flange thereof respectively.

3. A unitary motor vehicle jack adapted to elevate and support a motor vehicle wheel having a rim and a drum spaced therefrom and rotatable therewith, said jack comprising an elongated element having an integrally formed head portion adapted to detachably clamp the rim and drum when axially inserted therebetween and then swung inwardly toward the wheel, said jack having a foot portion extending radially beyond the periphery of the wheel when said head is thus inserted whereby rotation of the wheel in a movement of the vehicle effects an elevation and support of the wheel.

4. A unitary motor vehicle jack adapted to elevate and support a motor vehicle wheel having a rim and a drum spaced therefrom and rotatable therewith, said jack comprising an elongated element having an integrally formed head portion provided with a yoke adapted to detachably clamp the drum and provided with an integrally formed shoulder adapted to engage the rim when said head is axially inserted between the rim and the drum, said elongated element likewise having a foot portion extending radially beyond the periphery of the wheel when said head is thus inserted whereby rotation of the wheel in a movement of the vehicle effects an elevation and support of the wheel.

5. A unitary motor vehicle jack adapted to elevate and support a motor vehicle wheel having a rim and a drum spaced therefrom and rotatable therewith, said jack comprising an elongated element having an integrally formed offset head portion provided with oppositely disposed shoulders, one of said shoulders being adapted to engage the rim and the other of said shoulders being adapted to engage the drum when said head is axially inserted therebetween, said elongated element likewise having a foot portion extending radially beyond the periphery of the wheel when said head is thus inserted whereby rotation of the wheel in a movement of the vehicle effects an elevation and support of the wheel.

6. A device of the class described for raising the wheel of a vehicle from the ground and supporting the same in raised position comprising an elongated element extending radially of the wheel and beyond the periphery thereof, having releasable means for connecting said element with the wheel in rotatable relation therewith and a foot for maintaining said element in upright wheel-supporting position, said means including a pair of integrally formed parallel tongue portions of said element adapted to be spacedly removably inserted axially between parallel parts carried by the wheel and then swung inwardly toward the wheel.

7. A device of the class described for raising the wheel of a vehicle from the ground and supporting the same in raised position comprising an elongated element extending radially of the wheel and beyond the periphery thereof, having releasable means for connecting said element with the wheel in rotatable relation therewith and a foot for maintaining said element in upright wheel-supporting position, said means including an integrally formed tongue structure extending parallelly to said element and having a front face portion, said front face portion having a shoulder intermediate its top and bottom whereby the shoulder engages spaced parallel parts carried by the wheel when inserted axially therebetween and thereafter swung inwardly toward the wheel.

8. A device of the class described for raising the wheel of a vehicle from the ground and supporting the same in raised position comprising an elongated element extending radially of the wheel and beyond the periphery thereof, having clamping means for connecting said element with the wheel in rotatable relation therewith and a foot for maintaining said element in upright wheel-supporting position, said means including an integrally formed tongue portion of said element adapted to clamp between parallel parts carried by the wheel when inserted at an angle therebetween and then swung inwardly toward the wheel.

9. A device of the class described for raising and supporting in raised position a wheel of a vehicle which has a tire-carrying rim and a brake drum, said device consisting of an elongated element extending radially of the wheel and beyond the periphery thereof, having a foot for maintaining said element in upright wheel-supporting position and clamping means for connecting said element with the wheel in rotatable relation therewith, said means including an integrally formed tongue portion of said element adapted to detachably clamp between the brake drum and rim when inserted at an angle therebetween and then swung inwardly toward the wheel.

JOHN M. WESTRATE.